UNITED STATES PATENT OFFICE.

HARRY SHOEMAKER, OF PHILADELPHIA, PENNSYLVANIA, ASSIGNOR TO GUSTAVE P. GEHRING, OF PHILADELPHIA, PENNSYLVANIA, AND AMERICAN WIRELESS TELEPHONE & TELEGRAPH COMPANY, A CORPORATION OF ARIZONA TERRITORY.

WIRELESS-TELEGRAPH SYSTEM.

SPECIFICATION forming part of Letters Patent No. 710,121, dated September 30, 1902.

Application filed December 11, 1901. Serial No. 85,452. (No model.)

*To all whom it may concern:*

Be it known that I, HARRY SHOEMAKER, a citizen of the United States, residing at Philadelphia, in the county of Philadelphia and State of Pennsylvania, have invented certain new and useful Improvements in Wireless-Telegraph Systems, of which the following is a specification.

My invention relates to signaling systems, more particularly those in which the signals are transmitted by means of combined electrostatic and electromagnetic waves, commonly known as "Hertzian" waves.

The object of the invention is to obtain at the transmitter and receiver maximum effects for the amount of energy expended and comprises an arrangement of circuits such that the high-potential effects across the terminals of an inductance in a resonance-circuit are still further increased by an arrangement of circuits resembling the autotransformer. I use a resonant system both for the purpose of selectivity and also in order by the arrangement of circuits hereinafter shown to get a maximum difference of potential at the wave-responsive device, so that with the same amount of energy emitted at the transmitter messages can be recorded at greater distances than heretofore.

Reference is to be had to the accompanying sheet of drawings, in which—

Figure I represents the circuits of the transmitter diagrammatically. Fig. II represents diagrammatically the circuits of a receiver adapted for use in connection with the transmitter shown. Figs. III and IV show modified arrangements of the circuits at the receiving-stations.

A represents the aerial conductor common in wireless telegraphy and which is connected to earth-plate $e$ through an inductance L. Said inductance may be in the form of a coil and should preferably be a flat coil rather than one of small diameter and great length. The earth connection is made through an adjustable contact-point $b$ in the form of a rider, which is used to insert or cut out of the aerial circuit turns of the inductance L until the product of the capacity of the aerial circuit into its inductance is equivalent to that of the transmitting aerial circuit, thereby securing selectivity and, if desired, resonance. In other words, the rider $b$ adjusts the receiving-circuit to resonance with the transmitted waves.

In Fig. I the winding of the inductance extends beyond the rider-contact $b$ by a portion represented at $a$. Across the terminals of the entire winding L and $a$ is connected the secondary of the transformer T through the condenser K. The object of the condenser K is to prevent the short-circuiting of the secondary of transformer T through the windings L and $a$. The capacity of K is small, and therefore offers a high impedance to the relatively low-frequency current from the secondary of transformer T. K, with its small capacity, in conjunction with spark-gap S and windings L $a$, forms an oscillating circuit of high frequency and is one of the frequency-determining elements. Across the terminals of the secondary is connected the spark-gap S, as is usual in Hertzian telegraphy.

In circuit with the primary P is the source of current F, interrupter C, and key E. The interrupter C is of any well-known type, such as the Wehnelt, mercury, vibrator, or mechanical. The oscillations produced in the secondary circuit pass through the entire winding L and $a$, and that portion represented by L and the aerial conductor A are charged to a high potential and oscillate at a frequency dependent upon the capacity and the inductance of the circuit L $a$ S K. The natural rate of oscillation of the aerial A and inductance L is made equal to that of the circuit L $a$ S K and resonant with it. The portions L and $a$ operate together both as the inductance of a resonant circuit and an autotransformer, the primary connections of the autotransformer being across the lower terminal of $a$ and the upper terminal of L, and the secondary terminal being at the base of the aerial conductor A and the rider $b$. As a modification of the circuits shown in Fig. I, the connection at the lower end of $a$ might be removed and inserted at some place in the coil L above the point at which $b$ contacts, so that the autotransformer would cause a difference of potential across the inductance portion L of the circuit higher than exists across the secondary of the transformer T. Such connection may be shown by dotted line X in Fig. I.

By manipulating the key E in the well-known manner the radiation of electrical waves is controlled in accordance with the code.

In Fig. II, I have shown the receiving device, which comprises, as above stated, the aerial conductor A, inductance L, and earth connection through the rider $b$. The circuit A L $e$ is not only selective of, but also resonant with, the transmitted electromagnetic-wave energy. As is well known, it is the property in resonant circuits that across the terminals of the inductance (or the condenser) an extremely high difference of potential exists. The receiving-circuit being adjusted to resonance there is therefore across the terminals of the inductance L an extremely high difference of potential. This difference is accentuated by adding to the inductance L the portion $a$, having the same magnetic circuit as the winding L, so that the difference of potential across the inductance L is stepped up by the autotransformer L $a$. The result is that across the terminals of the wave-responsive device D, which may be among other things a coherer or anticoherer, a difference of potential exists which is very much greater than can be obtained in the usual system of connecting the coherer in the secondary of a transformer or directly in series with the aerial conductor.

The condensers $k$ prevent the current from battery B from circulating through the circuit L $a$ and relay R. Beyond the wave-responsive device are the choke-coils $f$, the battery B, and the relay R. Upon the reception of the wave energy the rider $b$ having been properly adjusted for resonance an extremely high difference of potential is applied to the terminals of the coherer or other device D, which causes it to vary the resistance of the circuit, including itself, the choke-coils $f$, the relay R, and the battery B. This causes the relay to operate its tongue or armature $t$, which controls a local circuit which includes a recording device, tapper, &c.

In Fig. III, I have shown a modification of the arrangement of circuits shown in Fig. II. The aerial conductor A, inductance L, rider $b$, and winding $a$ are the same as in the previous case. Across the terminals of the autotransformer the wave-responsive device D, the battery B, and relay R are connected in series, and upon the change of condition of the device D the tongue $t$ of the relay is actuated to control the recorder, tapper, &c. In shunt across the terminals of the relay R is the non-inductive resistance $r$ to absorb the kick of relay R.

In Fig. IV the relay R, with the non-inductive shunt across its terminals, is inserted at approximately the middle of the inductance L, the rider $b$ and winding $a$ operating as in former cases. The path of current in the local circuit is from battery B through upper coil of relay R, upper choke-coil $f$, upper portion of inductance L, wave-responsive device D, the remaining portion of the inductance L, and the winding $a$, lower choke-coil $f$, and lower coil of relay R. The purpose of the non-inductive resistance $r$ in shunt to the relay is to prevent the inductance of the relay-coils being an appreciable factor in determining the inductance of the aerial circuit and to absorb the inductive extra current of R. The condenser $k$ serves the same purpose as in Fig. II—that is, to prevent the short circuit of battery B.

Upon the reception of wave energy upon the aerial circuit and after the rider $b$ has been adjusted for resonance a maximum difference of potential is impressed upon the wave-responsive device D, which by its change of condition causes a relay-tongue $t$ to be actuated, which in turn controls the local circuit, including a recorder, tapping device, &c.

In place of the transformer system shown in Fig. I for generating the high-frequency oscillations any other source of such oscillations may be used—as, for instance, a high-frequency alternating-current generator or such a generator used in conjunction with the transformer.

It is to be understood also that the herein-described invention may be applied to those systems using two earth connections or no earth connections whatever at the receiver or transmitter and that for the device D may be used any wave-responsive device which either controls a circuit to produce a signal or which itself produces such signal.

What I claim as new, and desire to secure by Letters Patent, is—

1. In a wireless-telegraph system, a transformer; connections from the secondary of said transformer to an oscillator and to the terminals of a winding, a portion of said winding operating as the inductance element of a resonant radiating circuit.

2. A transmitter for wireless telegraphy, which comprises means for generating high-frequency oscillations, and connections from said generator to the terminals of a winding, a portion of said winding operating as the inductance element of a resonant radiating circuit.

3. A transmitter for wireless signaling, which comprises a source of high-frequency oscillations; and connections from the terminals of said source to the terminals of an autotransformer, one winding of said transformer operating as the inductance element of a resonant radiating circuit.

4. In a signaling system, the combination with a source of high-frequency electrical oscillations, of connections through a condenser to the terminals of an autotransformer, one winding of said autotransformer comprising the inductance element of a resonant radiating system.

5. In a signaling system, a transmitter which comprises a source of high-frequency electrical oscillations; means for controlling said oscillations in accordance with the signal sent; and connections from said source of oscillations to the terminals of a winding, a portion of said winding comprising the inductance element of a resonant radiating system.

6. In a signaling system, a transmitter which comprises a source of high-frequency electrical oscillations; connections from said source to the terminals of an autotransformer; and a connection from earth to one terminal of said autotransformer, the portion of the winding so determined operating as the inductance element of a resonant radiating system.

7. In a wireless signaling system, the combination with the transmitter, of a receiver, which comprises an aerial conductor and an inductance, said inductance forming one winding of an autotransformer.

8. In a signaling system, a receiver which comprises a resonant circuit, the inductance element of said circuit forming one winding of an autotransformer.

9. A receiver, comprising an aerial circuit, a rider for adjusting said circuit to resonance, the inductance member of said resonant circuit forming one winding of an autotransformer; and connections from said autotransformer to a wave-responsive device.

10. A receiver, comprising an aerial circuit, a rider for adjusting said circuit to resonance, the inductance member of said resonant circuit forming one winding of an autotransformer; connections from the terminals of said autotransformer to a wave-responsive device; and a local circuit controlled by said wave-responsive device.

11. In a signaling system, a freely-oscillating circuit, a radiating circuit of the same natural period, and a frequency-determining element common to both circuits.

12. In a signaling system, a freely-oscillating circuit, a radiating circuit, and an inductance common to both circuits.

13. In a signaling system, an aerial circuit selective of the transmitted energy, an inductance element of said circuit forming a winding of an autotransformer, and a wave-responsive device subjected to the potential of said autotransformer.

14. In a signaling system, a receiver which comprises a selective circuit, an inductance element of said circuit forming a winding of an autotransformer.

15. In a signaling system, a receiver comprising a circuit selective of the transmitted energy, an inductance element of said circuit forming a winding of an autotransformer, a condenser in series with said inductance, a local circuit in shunt to said condenser, and a wave-responsive device influenced by said autotransformer and controlling said local circuit.

16. In a signaling system, a receiver comprising a circuit selective of the transmitted energy, an inductance element of said circuit forming a winding of an autotransformer, a condenser in series with said inductance approximate its middle, a local circuit in shunt to said condenser, and a wave-responsive device influenced by said autotransformer and controlling said local circuit.

In testimony whereof I have signed my name to this specification in the presence of two subscribing witnesses.

HARRY SHOEMAKER.

Witnesses:
J. M. SAWYER,
L. T. RHOADES.